US008762784B1

(12) United States Patent
Portal et al.

(10) Patent No.: US 8,762,784 B1
(45) Date of Patent: Jun. 24, 2014

(54) VIEWING MULTI-DIMENSIONAL METRIC DATA FROM MULTIPLE TEST CASES (71) Applicant: The MathWorks, Inc., Natick, MA (US)

(72) Inventors: Christian Portal, Holliston, MA (US); Michael J. Thomas, Park City, UT (US); James G. Owen, Bolton, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 13/847,182

(22) Filed: Mar. 19, 2013

Related U.S. Application Data (63) Continuation of application No. 12/124,854, filed on May 21, 2008, now Pat. No. 8,402,317, which is a continuation-in-part of application No. 11/317,423, filed on Dec. 22, 2005, now Pat. No. 8,279,204.

(51) Int. Cl.
G06F 11/00 (2006.01)
(52) U.S. Cl.
USPC .............................................. 714/37; 714/25
(58) Field of Classification Search
USPC .......................................................... 714/37
See application file for complete search history.

(56) References Cited

U.S. PATENT DOCUMENTS

| 4,817,093 | A | 3/1989 | Jacobs et al. |
| 5,369,738 | A | 11/1994 | Bremner, III |
| 5,618,744 | A | 4/1997 | Suzuki et al. |
| 5,657,247 | A | 8/1997 | Daniel et al. |
| 5,892,949 | A | 4/1999 | Noble |
| 6,363,320 | B1 | 3/2002 | Chou |
| 6,545,500 | B1 | 4/2003 | Field |
| 6,567,791 | B2 | 5/2003 | Lent et al. |
| 6,751,359 | B1 | 6/2004 | Handley |
| 6,774,813 | B2 | 8/2004 | van Ee et al. |
| 6,778,710 | B1 | 8/2004 | Handley |
| 6,978,401 | B2 | 12/2005 | Avvari et al. |
| 7,043,343 | B1 | 5/2006 | Houlberg et al. |
| 7,165,074 | B2 | 1/2007 | Avvari et al. |
| 7,167,870 | B2 | 1/2007 | Avvari et al. |
| 7,183,970 | B1 | 2/2007 | Houlberg et al. |
| 7,231,553 | B2 | 6/2007 | Stephens et al. |
| 7,240,243 | B2 | 7/2007 | Decker |

(Continued)

FOREIGN PATENT DOCUMENTS

WO   03/065890 A2   8/2003

OTHER PUBLICATIONS

Co-pending U.S. Appl. No. 13/614,237 entitled "Viewer for Multi-Dimensional Data From a Test Environment", by Owen et al., filed Sep. 13, 2012, 27 pages.

(Continued)

Primary Examiner — Kamini Patel
(74) Attorney, Agent, or Firm — Harrity & Harrity, LLP (57) ABSTRACT A viewer is disclosed for viewing a multi-dimensional data set. The viewer may be coupled to or included in a test environment and receive data generated in the test environment. The test environment may generate metric data from the multiple test cases of a UUT. The viewer may display the cumulative metric data generated from multiple test cases. The viewer may display the cumulative metric data in a fashion that the user can gain insight into the UUT's characteristics.

20 Claims, 8 Drawing Sheets (56) References Cited

U.S. PATENT DOCUMENTS

| | | |
|---|---|---|
| 7,275,235 B2 | 9/2007 | Molinari et al. |
| 7,278,059 B2 | 10/2007 | Hughes |
| 7,281,165 B2 | 10/2007 | Liu et al. |
| 7,292,990 B2 | 11/2007 | Hughes |
| 7,302,421 B2 | 11/2007 | Aldridge |
| 7,345,700 B2 | 3/2008 | Nortrup |
| 7,395,167 B2 | 7/2008 | Frolik |
| 7,430,337 B2 | 9/2008 | Deshpande et al. |
| 7,480,589 B2 | 1/2009 | Ii |
| 7,539,591 B2 * | 5/2009 | House et al. .................. 702/122 |
| 7,639,849 B2 | 12/2009 | Kimpe et al. |
| 8,279,204 B1 | 10/2012 | Owen et al. |
| 8,402,317 B1 | 3/2013 | Portal et al. |
| 2002/0077807 A1 | 6/2002 | Davis et al. |
| 2002/0091991 A1 | 7/2002 | Castro |
| 2003/0058280 A1 | 3/2003 | Molinari et al. |
| 2003/0093737 A1 * | 5/2003 | Purtell et al. .................. 714/738 |
| 2003/0112234 A1 | 6/2003 | Brown et al. |
| 2003/0195897 A1 | 10/2003 | Agrafiotis et al. |
| 2003/0200244 A1 | 10/2003 | Abraham et al. |
| 2003/0212661 A1 | 11/2003 | Avvari et al. |
| 2003/0212924 A1 | 11/2003 | Avvari et al. |
| 2004/0025088 A1 | 2/2004 | Avvari et al. |
| 2004/0044933 A1 | 3/2004 | Jeddeloh |
| 2004/0054940 A1 | 3/2004 | Uzelac et al. |
| 2004/0054950 A1 | 3/2004 | Larson et al. |
| 2004/0098643 A1 | 5/2004 | Schulz |
| 2005/0027656 A1 | 2/2005 | Tobler et al. |
| 2005/0028062 A1 | 2/2005 | Herrmann et al. |
| 2005/0102292 A1 | 5/2005 | Tamayo et al. |
| 2005/0144547 A1 | 6/2005 | Li |
| 2005/0147319 A1 | 7/2005 | Deshpande et al. |
| 2005/0166063 A1 | 7/2005 | Huang |
| 2005/0192777 A1 | 9/2005 | Banfer |
| 2005/0268171 A1 | 12/2005 | House et al. |
| 2006/0061547 A1 | 3/2006 | Bramwell et al. |
| 2006/0150025 A1 | 7/2006 | Hughes |
| 2006/0165311 A1 | 7/2006 | Watson |
| 2006/0262147 A1 | 11/2006 | Kimpe et al. |
| 2006/0291473 A1 | 12/2006 | Chase et al. |
| 2007/0043994 A1 | 2/2007 | Rosen |
| 2007/0052582 A1 | 3/2007 | Houlberg et al. |
| 2007/0053513 A1 | 3/2007 | Hoffberg |
| 2007/0080280 A1 | 4/2007 | Havens |
| 2007/0088627 A1 | 4/2007 | Elson et al. |
| 2007/0220479 A1 | 9/2007 | Hughes |
| 2008/0002910 A1 | 1/2008 | Ojima et al. |
| 2008/0038098 A1 | 2/2008 | Ito et al. |
| 2008/0097712 A1 | 4/2008 | Bruce et al. |
| 2008/0120129 A1 | 5/2008 | Seubert et al. |
| 2008/0144186 A1 | 6/2008 | Feng et al. |
| 2008/0172655 A1 | 7/2008 | Davia |
| 2008/0209392 A1 | 8/2008 | Able et al. |
| 2009/0044177 A1 | 2/2009 | Bates et al. |
| 2010/0095158 A1 | 4/2010 | Shah-Hosseini |
| 2010/0329585 A1 | 12/2010 | Watson |
| 2011/0246540 A1 * | 10/2011 | Salman et al. ................ 707/812 |
| 2012/0253728 A1 * | 10/2012 | Chamas et al. ............... 702/109 |
| 2013/0007519 A1 * | 1/2013 | Kristoffersen et al. ......... 714/27 |

OTHER PUBLICATIONS

TDB-ACC-No. NN8803411 Disclosure Title: Interactive Layout Facility for Display of Array Device Failure Cell Maps. Publication Data: IBM Technical Disclosure Bulletin, Mar. 1988, US vol. 30(10):411-413 (1988) Cross Reference: 0018-8689-30-10-411, 8 pages.

* cited by examiner

| Model Hierarchy: | Complexity | D1 | C1 | MCDC |
|---|---|---|---|---|
| 1. req test | 35 | 84% | 70% | 50% |
| 2. ... Logic | 25 | 78% | 75% | 50% |
| 3. ...... SF: Logic | 24 | 78% | 75% | 50% |
| 4. ......... SF: Altitude | 11 | 100% | 83% | 67% |
| 5. ............ SF: Active | 4 | 100% | N/A | N/A |
| 6. ........ SF: GS | 13 | 61% | 67% | 33% |
| 7. ............ SF: Active | 6 | 50% | N/A | N/A |
| 8. ............... SF: Coupled | 3 | 33% | N/A | N/A |

| Summary Metric: Complexity | Unfiltered | Filtered |
|---|---|---|
| High | 37 | 32 |
| Low | 21 | 27 |
| Mean | 30 | 30 |
| Median | 28 | 29 |
| STD | 3.4 | 2.1 |

VIEWING MULTI-DIMENSIONAL METRIC DATA FROM MULTIPLE TEST CASES

RELATED APPLICATION

The present application is a continuation of, and claims priority to, U.S. patent application Ser. No. 12/124,854, entitled "Viewing Multi-Dimensional Metric Data from Multiple Test Cases," now U.S. Pat. No. 8,402,317, filed on May 21, 2008, which is a continuation-in-part of U.S. patent application Ser. No. 11/317,423 entitled "VIEWER FOR MULTI-DIMENSIONAL DATA FROM A TEST ENVIRONMENT," filed on Dec. 22, 2005, the contents of which is incorporated by reference.

BACKGROUND INFORMATION

Development tools are devices that include software that aids a developer in developing hardware and/or software. Development tools may incorporate a test environment or alternatively, may be coupled to a test environment. The test environment tests operational features of the hardware and/or software under development. This hardware and/or software is referred to as the "UUT" (UUT). The test environment may include a test executive for managing execution of code for testing the UUT. This test executive may generate and record a data set from when the UUT is tested.

Development tools may provide a viewer for viewing data generated or utilized in the tools. A viewer may include application software that displays stored data and/or images. The viewer may receive test data from the test executive and may display the data to provide a user with information on the test data.

SUMMARY

In an exemplary embodiment, a method is provided for displaying multi-dimensional metric data on a display. The multi-dimensional metric data is received from a plurality of test cases, where the plurality of test cases test a UUT in a test environment. An input is received to select a first group of test cases from the plurality of test cases. The structure of the UUT is determined and transformed or adapted for displaying the metric data. The structure of the UUT and the metric data are displayed for the first group of test cases on a display in response to the input.

In an exemplary embodiment, a system is provided for displaying multi-dimensional metric data on a display. The system includes a test environment for testing a UUT, wherein the test environment performs a plurality of test cases and generates multi-dimensional metric data for the plurality of test cases. The system also includes a viewer to determine a structure of the UUT, transform the structure of the UUT for displaying the metric data and display the structure of the UUT and the metric data for a first group of test cases to a user in response to the input that selects the first group of test cases.

In an exemplary embodiment, a computer-readable medium is provided for storing computer-executable instructions that when executed by a computing device cause to display multi-dimensional metric data on a display. The multi-dimensional metric data is received from a plurality of test cases, where the plurality of test cases test a UUT in a test environment. An input is received to select a first group of test cases from the plurality of test cases. The structure of the UUT is determined and transformed or adapted for displaying the metric data. The structure of the UUT and the metric data are displayed for the first group of test cases on a display in response to the input.

BRIEF DESCRIPTION OF THE DRAWINGS

The aforementioned features, advantages and other features will become better understood with regard to the following description and accompanying drawings, wherein.

DETAILED DESCRIPTION

For the discussion below, certain terms are defined as used throughout the specification.

As used herein term "test" is used to refer to a sequence of actions for testing operational features of a UUT in a test environment. The sequence of actions may include a single action or multiple actions for testing the UUT. For example, the sequence of actions may include an action for reading data from the UUT and/or an action for writing data on the UUT.

As used herein the term "test case" is used to refer to a test executed with a set of test conditions under which the test may determine whether a requirement associated with a UUT is partially or fully satisfied. Multiple test cases may refer to the tests of a UUT executed with different sets of test conditions.

As used herein the term "test condition" is used to refer to one or more conditions under which a sequence of actions in a test are executed for testing a UUT. The test condition may be defined by specifying parameters for executing a test.

As used herein the term "metric data" is used to refer to data that may provide information on how a test case tests a UUT. The metric data may provide information for measuring the performance or quality of the UUT. For example, when the UUT includes software, the metric data may be model coverage data, code coverage data, memory usage data, performance statistics data, etc. The model coverage data may refer to the data that describes how thoroughly a test case tests a model. The code coverage data may refer to the data that shows the degree to which the source code of a program has been tested. The memory usage data may refer to the data that enables a user to determine how memory space is used during the exercise of test cases.

As used herein the term "test executive" is used to refer to a group of machine executable instructions for managing the exercise of test cases for testing a UUT in a test environment. For example, the test executive may enable a user to launch, edit, debug, record and analyze the test data.

As used herein the term "test environment" is used to refer to resources available to a user for testing a UUT. The test environment may include software and/or hardware. For example, in one embodiment, software that executes a test case may be run on general purpose hardware or custom hardware (e.g., hardware designed for a specific task).

As used herein the term "multi-dimensional data" is used to refer to data having two or more dimensions. For example, the simulation data for a throttle body system may be multi-dimensional data, where the data is a function of time, throttle position, throttle angle, input voltage, and test run. The test run may be the 1, . . . , N iterations of running the system, each under different operating conditions.

An exemplary embodiment may provide a viewer for viewing multi-dimensional data from multiple test cases for testing a UUT. Viewing data of multiple test cases at a time may help a user gain insight into the characteristics of the UUT.

The viewer may be coupled to the test environment to receive the metric data from the test environment. Alternatively, the viewer may be integrated into the test environment so that the viewer can receive the metric data. The test environment may exercise multiple test cases for testing the operational features of a UUT. The test environment may generate metric data from the multiple test cases. The viewer may display the cumulative metric data generated from the multiple test cases so that the user can easily obtain information on the characteristics of the UUT for all test cases examined.

The viewer may provide various features for viewing and exploring cumulative metric data generated from the multiple test cases. For example, the viewer may include a feature for including and excluding test cases using customizable criteria. The criteria can be defined using the parameters or variables of the test cases and/or the metrics of the metric data. The viewer may allow a user to select individual test cases. The viewer may also allow a user to create one or more groups of test cases, and to find the difference, union or intersection of test cases between the groups. The viewer may view the resulting metric data for chosen test cases. The viewer may analyze the metric data to provide statistics of the metric data so that the user can understand the characteristics of the UUT, such as the complexity of the UUT. The complexity of a UUT may be provided using cyclomatic complexity data when the UUT is software.

Figure 1A:
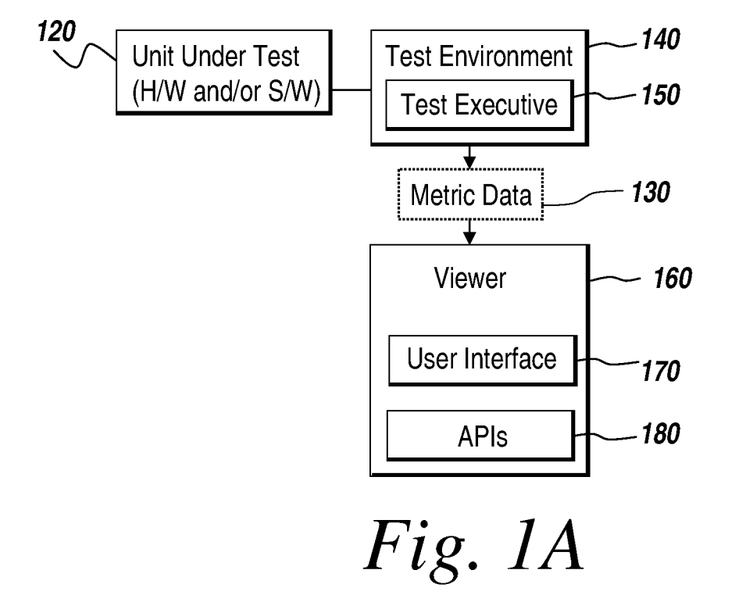
FIGS. 1A-1B depict an exemplary system suitable for practicing an exemplary embodiment.
Figure 1B:
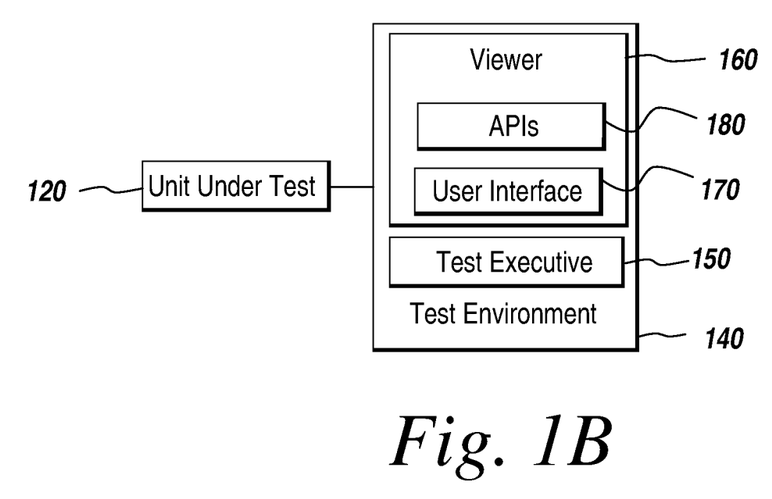

FIGS. 1A and 1B depict several components for practicing an exemplary embodiment. The components may include test environment 140 and viewer 160 coupled to test environment 140. Viewer 160 may be separate from test environment 140, as depicted in FIG. 1A, or viewer 160 may be incorporated in test environment 140, as depicted in FIG. 1B.

Test environment 140 may enable a user, such as a programmer or a software or hardware designer, to test operational features of UUT 120. UUT 120 can be hardware, software, firmware or any combination thereof. For example, UUT 120 can be any type of devices that can process instructions. The hardware may be test directly or through software, such as MATLAB code, a Simulink model, C/C++ code, etc. UUT 120 may execute single or multiple threads, include single or multiple cores or processors and may include application specific types of logic such as FPGAs, ASICS, DSPs, etc. Test environment 140 may include test executive 150 for performing a sequence of tests for testing UUT 120. Test executive 150 may exercise test cases using various resource programs or software products and may generate test data from the tests. Test executive 150 may also generate metric data 130 that includes the results of the test. Metric data 130 may be stored in a storage element so that viewer 160 can retrieve metric data 130. Exemplary test environments may be found in products developed with the SystemTest™ software from The MathWorks, Inc. The SystemTest software provides a software framework for developing tests that exercise MATLAB® algorithms and/or Simulink® models.

Test environment 140 may include a technical computing environment (TCE) and embodiments can be implemented in the TCE. A TCE may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language such as C++, C, Fortran, Pascal, etc.

In one implementation, TCE may include a dynamically typed language that can be used to express problems and/or solutions in mathematical notations familiar to those of skill in the relevant arts. For example, TCE may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

TCE may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

Viewer 160 may receive metric data 130 generated from the test cases in Test environment 140 and may analyze metric data 130 to display useful information regarding the characteristics of the UUT. Viewer 160 may include user interface 170 for receiving user inputs and for displaying metric data 130 in response to user inputs. For example, user interface 170 may display information resulting from analyzing the metric data. From the metric data displayed via user interface 170, a designer or programmer can understand the characteristics of the UUT.

Viewer 160 may further provide application program interfaces (APIs) 180 to enable viewer 160 to support viewing metric data 130. APIs 180 may allow the data viewing and/or presentation of information to be customized for any metric data 130 generated in test environment 140. For example, APIs 180 may enable a user to define metric data 130 to be one of model coverage data, code coverage data, memory usage data, performance statistics data, etc. The model coverage data may show how thoroughly a test case tests a model. The code coverage data may describe the degree to which the source code of a program has been tested. The memory usage data may indicate how memory space is used during the exercise of test cases. APIs 180 may also enable a user to select metric data 130 more specifically. For example, the user may select as metric data 130 model coverage data including one or more of cyclomatic complexity data, decision coverage data, condition coverage data, modified condition/decision coverage data, lookup table coverage data, etc.

FIG. 1B depicts an exemplary embodiment wherein viewer 160 is included in test environment 140. In this example, viewer 160 may be incorporated into test environment 140 and the metric data viewing feature can be provided as a function in test environment 140. The description of components set forth above with reference to FIG. 1A can be applied to the components depicted in FIG. 1B.

Figure 2:
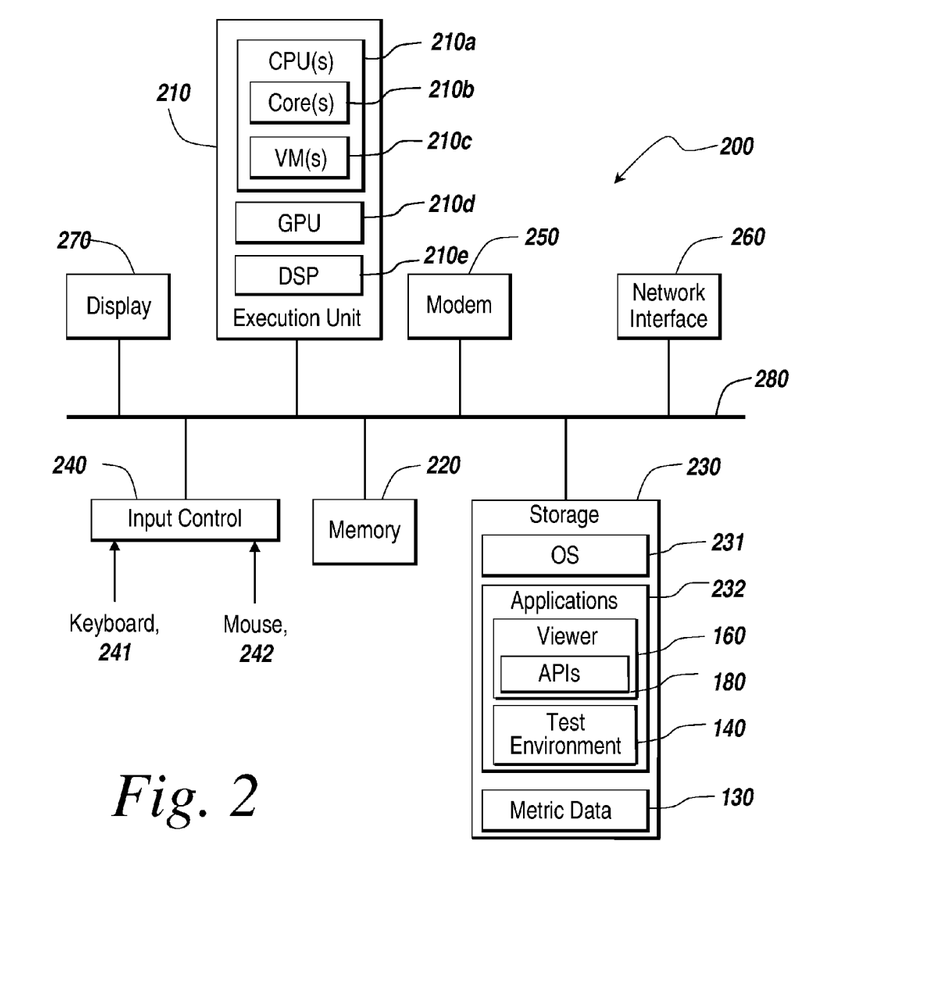
FIG. 2 is an exemplary computing device for implementing an exemplary embodiment.

FIG. 2 is an exemplary computing device 200 suitable for practicing exemplary embodiments. One of ordinary skill in the art will appreciate that computing device 200 is intended to be illustrative and not limiting. Computing device 200 may take many forms, including but not limited to a workstation, server, network computer, quantum computer, optical computer, bio computer, Internet appliance, mobile device, a pager, a tablet computer, and the like.

Computing device 200 may include execution unit 210. Execution unit 210 may execute software programs, computer-executable instructions or code to control the components of computing device 200. By executing the software programs, computer-executable instructions or code, computing device 200 may provide test environment 140 and viewer 160 as well as other functions.

Computing device 200 may also include computer-readable storage mediums, such as memory 220 and storage 230, that store software programs, computer-executable instructions or code. Memory 220 stores computer executable instructions and data and provides them to execution unit 210 so that execution unit 210 operates computing device 200 and runs test environment 140 and viewer 160. Storage 230 may contain store software programs, computer-executable instructions or code for applications. Storage 230 may include, in particular, operating system (OS) 231, applications 232 running on operating system 231, such as viewer 160, test environment 140, and metric data 233 generated in test environment 140. Applications 232 may be stored in memory 220 as well, or applications 232 may be stored on the network as described below with reference to FIG. 3.

Optionally, computing device 200 may include multiple Central Processing Units (CPUs) 210a for executing software programs, applications, instructions or code loaded in memory 220, and other programs for controlling system hardware. Each CPU 210a can include a single core or multiple cores 210b. The software read in memory 220 may run in a virtualized environment, such as in a Virtual Machine (VM) 210c. Multiple VMs 210c may be resident on a single processor. CPUs 210a may be a general purpose processor or other types of processors, such as reduced instruction set processors, a field programmable gate array (FPGA) or an application specific integrated circuit (ASIC), etc. Also, part or all of the software may be run in hardware (H/W), for example, a graphics processing unit (GPU) 210d, a digital signal processor (DSP) 210e, etc.

Computing device 200 may further include other devices, such as input control 240, modem 250, network interface 260, and display 270. Input control 240 may interface with keyboard 241, mouse 242, and other input devices. Computing device 200 may receive through input control 240 input data necessary for viewing metric data 130 generated from multiple test cases for testing a UUT. Computing device 200 may present in display 270 user interfaces for the users to input data and for viewing multi-dimensional metric data 130. The resources depicted in FIG. 2 may be connected to each other through bus 280. Bus 280 may be an on-chip, off-chip or network bus. Bus 280 may include a control-area network (such as Controller Area Network (CAN), FlexRay, TTP, ARINC) bus.

Figure 3:
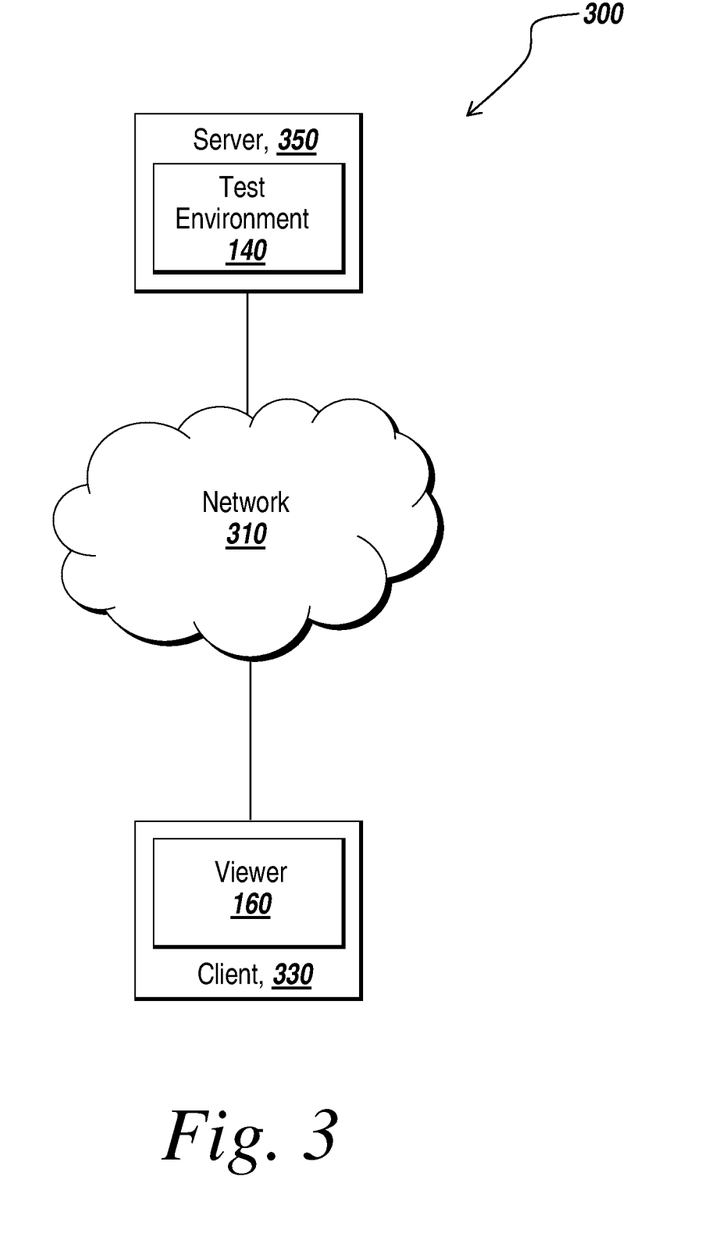
FIG. 3 is an exemplary network environment that enables an online implementation of an exemplary embodiment.

FIG. 3 depicts an exemplary network environment 300 suitable for the distributed implementation of an exemplary embodiment. Client 330 and server 350 may be coupled to network 310 through communication links. Network interface 260 and modem 250 of computing device 200 (shown in FIG. 2) enable client 330 to communicate with server 350 through communication network 310. Communication network 310 may include a control-area network (such as CAN, FlexRay, TTP, ARINC for e.g. Automotive and avionic applications), Internet, intranet, Local Area Network (LAN), Wide Area Network (WAN), Metropolitan Area Network (MAN), Wireless, Optical, etc. Network environment 300 can support the distributed implementations. The network interface may employ a variety of connections including, but not limited to, standard telephone lines, LAN or WAN links (e.g., T1, T3, 56 kb, X.25), broadband connections (e.g., ISDN, Frame Relay, ATM), cluster interconnection (Myrinet), peripheral component interconnections (PCI, PCI-X), wireless connections (e.g., 802.11), or some combination of any or all of the above.

In network environment 300, server 350 may provide client 330 with software components or products under a particular condition, such as a license agreement or service contract. The software components, products, or services may include those for viewer 160. For example, client 330 may request server 350 perform a test for testing a UUT. Server 350 may perform the requested test and may send client 330 the test data for viewing. The test data may include metric data of the test. Client 330 may subsequently display the metric data to a user.

Figure 4:
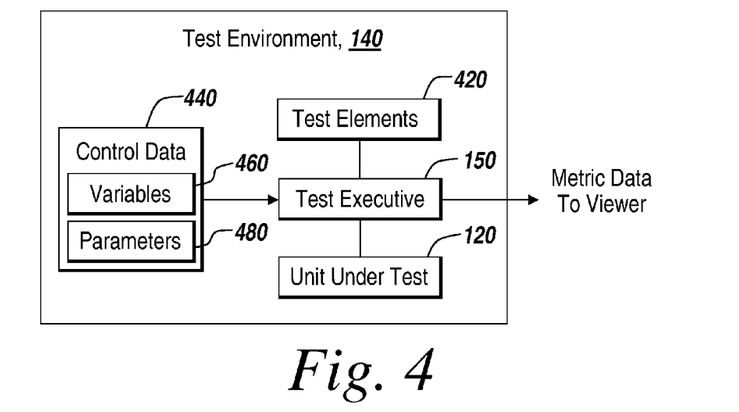
FIG. 4 shows an exemplary test environment suitable for practicing an exemplary embodiment.

FIG. 4 depicts in more detail an exemplary test environment 140. Test environment 140 may include test executive 150 for managing various types of actions for testing UUT 120. Test executive 150 may allow a user to define a sequence of actions for testing UUT 120 using test elements 420 provided in test environment 140. Elements 420 may embody some tasks that test cases may perform. For example, a data read/write element may perform the task of reading/writing data from/on UUT 120. The user may define the sequence of actions that the test cases may perform by assembling test elements 420.

Test elements 420 may include various programs provided in text-based or graphically-based programming tools. Elements 420 can also include data so that test environment 140 may test the data, such as finding the limit values of the data. Elements 420 may also include functions provided in software products. For example, elements 420 may provide the functions of reading/writing data from/on UUT 112.

The user may input control data 440 for setting test conditions of the test cases. The user may also input variables 460 and/or parameters 480 for the test cases that can be used as arguments to call the functions provided in test elements 420. In some instances, the test cases may depend on variables 460 and parameters 480. For example, if a test variable is configured to a maximum upper limit, it may represent a test condition for a test case, i.e. the test case doesn't pass unless the test condition is satisfied. In other instances, the test cases may not depend on variables 460 and parameters 480. For example, a test variable may be used to store a temporary value that is used for display purposes or for analysis during test execution. In this instance, the test case may be independent of the variable. Parameters 480 may define conditions of the test cases when the test cases are executed. A user may specify some of the variables to return to the user so that the user can obtain the values of the specified variables. UUT 120 can be tested by test executive 150 with different variables 460 and parameters 480 in the test cases. With different variables 460 and parameters 480, the functions of elements 420 may return different outputs for the test cases.

Figure 5A:
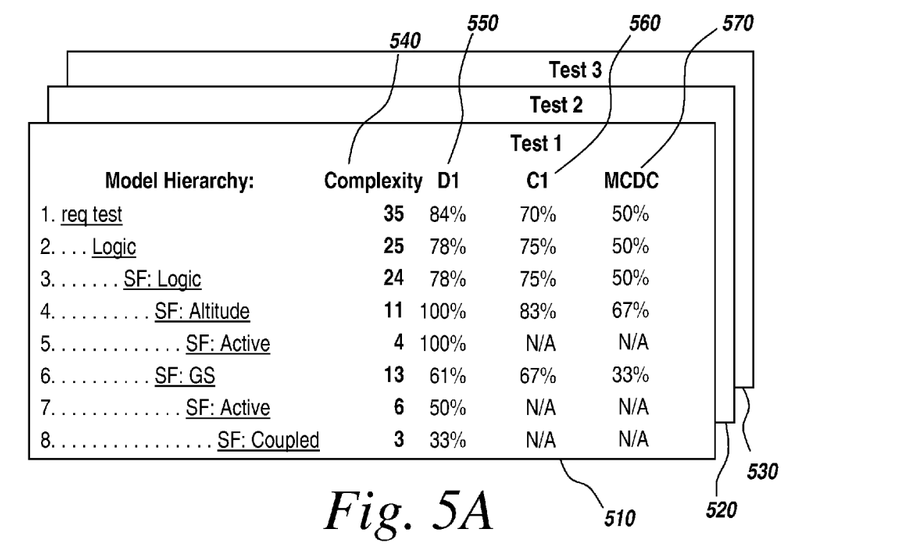
FIG. 5A depicts exemplary metric data generated from multiple test cases.

FIG. 5A depicts exemplary metric data generated from multiple test cases that can be used to test a UUT. In an exemplary embodiment, model coverage data is generated from multiple test cases 510, 520 and 530 for testing a model. Test executive 150 may record and analyze the data generated in the test cases of UUT 120. In each test case, test executive 150 may generate model coverage data including cyclomatic complexity data 540, decision coverage data (D1) 550, condition coverage data (C1) 560, and/or modified condition/decision coverage (MCDC) 570.

Model coverage is a measure of how thoroughly a test case tests a model. Model coverage may enable a user to validate the functional behaviors of a model being tested. Model coverage may also enable a user to determine whether some test cases are redundant. In an exemplary embodiment, model coverage may refer to the percentage of pathways that a test case exercises.

Cyclomatic complexity data 540 is a measure of the structural complexity of a model. Cyclomatic complexity data 540 may approximate the McCabe complexity measure for code generated from the model.

Decision coverage data (D1) 550 provides information regarding items that represent decision points in a model. For an item in a model, decision coverage may identify percentage of the total number of simulation paths through the item that the simulation actually traversed.

Condition coverage data (C1) 560 provides information regarding blocks that output the logical combination of their inputs.

Modified condition/decision coverage data (MCDC) 570 provides information regarding blocks that output a logical combination of their inputs and/or transitions. MCDC 570 may determine the extent to which the test case tests the independence of logical block inputs and transition conditions. A test case achieves full coverage for a transition when, for each condition on the transition, there is at least one time when a change in the condition triggers the transition.

The metrics of the model coverage data described above are exemplary and other embodiments may generate model coverage data with a different set of metrics. Furthermore, the model coverage data is an example of metric data and other embodiments may use different metric data, such as code coverage data, memory usage data, performance statistics data, etc. The memory usage data provides a measure for determining how memory space is used during the exercise of test cases. In an embodiment, the example of monitoring test regressions, such as percentage of tests failing/passing over a period of time, may be used as metric data.

Figure 5B:
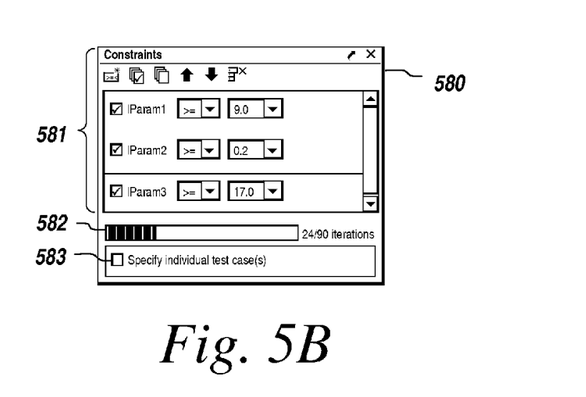
FIG. 5B is an exemplary user interface provided in an exemplary embodiment.

FIG. 5B shows exemplary user interface 580 provided in an exemplary embodiment. User interface 580 may include pane 581 for enabling the user to input mathematical or logical criteria for including or excluding the test cases to be viewed or analyzed in viewer 160. The criteria may be defined using the parameters of the test cases. The criteria may also be defined using the metrics of the metric data generated from the test cases. Test cases may be included or excluded by the combination of the filtering criteria or rules. User interface 580 may include bar 582 to show how many tests are included or excluded by the combination of the filtering criteria or rules. The relative length of bar 582 may represent a proportion of the tests filtered by the filtering criteria. In this example, twenty four test cases are selected from ninety test cases. In other embodiments, different types of indicators, such a circle diagram, gauge, digital numeric readout, may be used.

A striated bar may be used, as shown in FIG. 5B, instead of a solid bar. The striation may provide a graphical summary of the tests selected by the application of mathematical or logical filtering criteria. The striated bar may provide a positional representation of which test cases are included and excluded by the filtering criteria. For example, the stripes in the striated bar may represent the tests included by the filtering criteria and the blank areas between the stripes may represent the tests excluded by the filtering criteria. The striated bar may provide rapid feedback to the user on the extent of tests excluded by the criteria (the density of the striations) and the distribution of included tests over the entire set of tests (the dispersion of the striation).

In an exemplary embodiment, user interface 580 may provide check box 583 for enabling a user to select individual test cases. The user may specify one or more of filtered or unfiltered test cases. For example, the user can specify one or more test cases from the twenty four filtered tests. In an exemplary embodiment, user interface 580 may provide a button and a text box to locate particular test cases. Then, viewer 160 may display the metric data for the specified test cases.

In an exemplary embodiment, viewer 160 may allow a user to create multiple groups of test cases using different filtering criteria. Viewer 160 may allow a user to find the difference, union or intersection of test cases between the multiple groups. Viewer 160 may view the metric data generated from the resulting test cases.

Figure 5C:
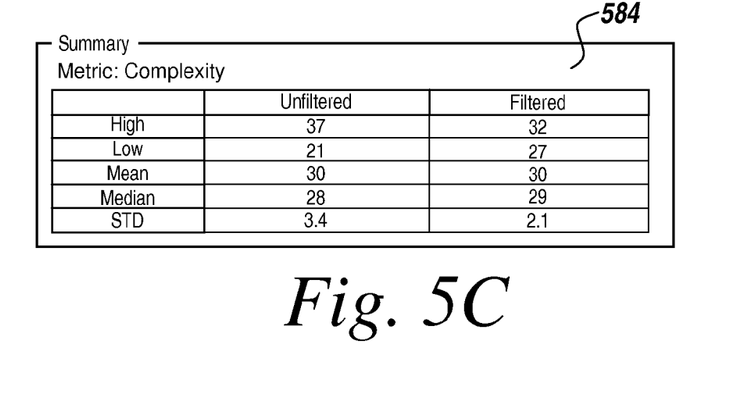
FIG. 5C is an exemplary user interface for providing statistics in an exemplary embodiment.

In an exemplary embodiment, viewer 160 may provide tabular statistical summary 584 for a selected metric, as shown in FIG. 5C. The statistics may be based on the values of the selected metric across all test cases or the constrained/filtered set of test cases defined by applying filleting criteria. Summary 584 may contain descriptive statistical information describing the variation of the metrics among the test cases. The summary information for the filtered set of test cases may update when the filtering rules are modified.

Figure 5D:
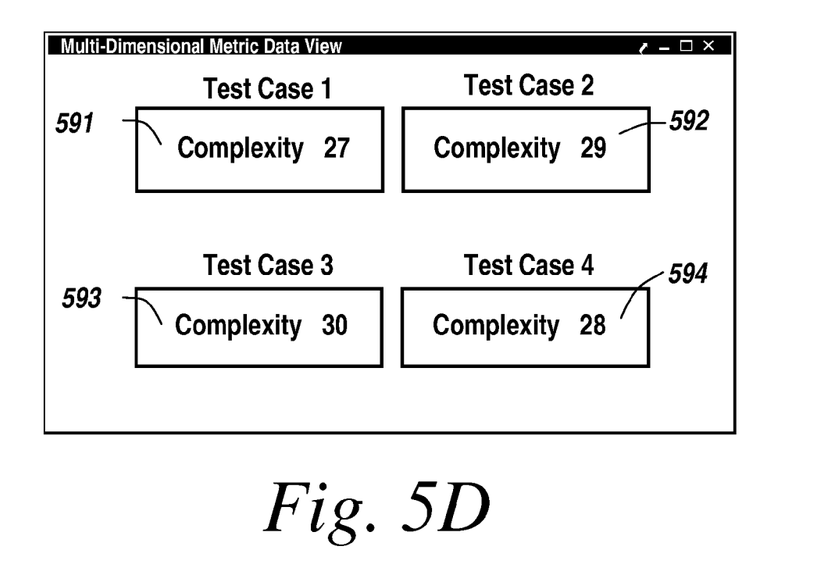
FIG. 5D is an exemplary user interface for providing multi-dimensional metric data from multiple test cases in an exemplary embodiment.

FIG. 5D shows an exemplary user interface for providing multi-dimensional metric data generated from selected test cases in an exemplary embodiment. An exemplary embodiment may distinguish subspaces of the metric data using rows and columns, and may enable a user to explore the relationship between test cases. For example, metric data 591 and 592 generated from Test Case 1 and Test Case 2, respectively, may be displayed in the first row and metric data 593 and 594 generated from Test Case 3 and Test Case 4, respectively, may be displayed in the second row. With this feature, an exemplary embodiment may display info about how the metric data changes as the test conditions are varied. In other embodiments, the subspaces of the metric data generated from different test cases may be distinguished using colors. In this case, the metric data generated from multiple test cases may be displayed in the same space with different colors.

An exemplary embodiment may automatically update the display and view of the metric data when the user modifies the filtering criteria. The automatic update may reflect any changes in the set of filtered tests when the filtering criteria are modified. This feature may allow the user to constrain or filter the test cases in various ways and observe the effect on the metric data set.

Figure 6:
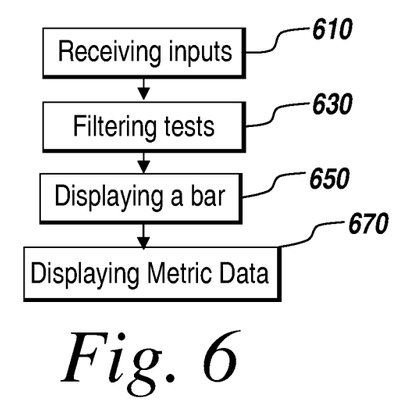
FIG. 6 is a flow chart showing an exemplary process of a viewer provided in an exemplary embodiment.

FIG. 6 is a flow chart showing an exemplary operation of a viewer that includes or excludes test cases. A viewer may receive user inputs for selecting tests through a user interface (step 610). The user may input mathematical or logical criteria of parameters for including or excluding test cases to be viewed and analyzed in the viewer. The user may also input criteria of metrics for including or excluding test cases to be viewed and analyzed in the viewer. The viewer may filter the test cases based on the user-defined criteria and select test cases that meet the filtering criteria or rules (step 630). The viewer may display a graphical element, such as a solid bar or a striated bar, to show how many tests are included or excluded by the combination of the filtering criteria or rules (step 650). Viewer may also display metric data generated from the selected test cases (step 670).

Figure 7:
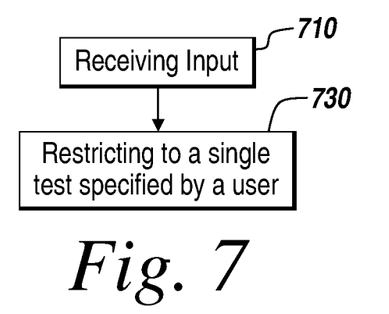
FIG. 7 is a flow chart showing another exemplary process of a viewer provided in an exemplary embodiment.

FIG. 7 is a flow chart showing an exemplary operation of a viewer for including individual test cases. Generally, the viewer may display data from multiple tests that are constrained or filtered by various criteria. An exemplary embodiment may enable a user to restrict the set of test cases to individual test cases. In an exemplary embodiment, a user interface may receive user inputs for selecting individual test cases (step 710). In an exemplary embodiment, the user may specify one or more of filtered or unfiltered test cases. The viewer may restrict to the specified test cases and may display metric data generated from the specified test cases (step 730).

Figure 8:
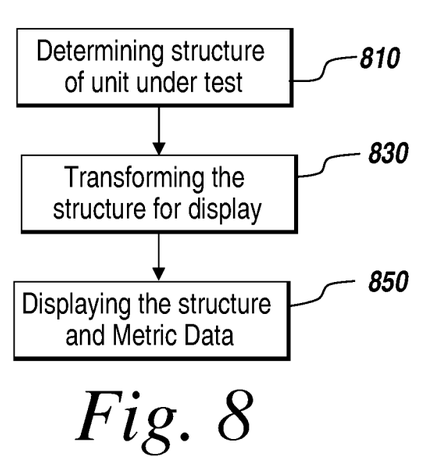
FIG. 8 is a flow chart showing an exemplary operation of viewer for displaying information on the structure of a UUT.

FIG. 8 is a flow chart showing exemplary operation of viewer 160 for displaying information on the structure of a UUT. Viewer 160 may receive or determine the structure of a UUT (step 810). The structure of a UUT may be determined by the information that describes the contents of the UUT being executed. For example, when the UUT is textual code, the structure of the UUT may include the code text, line numbers, textual layout of the code, any special highlighting inherit to the code, etc.

An exemplary UUT is provided as follows.
plot(rand(1, 10), rand(1, 10))
xlabel('x')
title('Plot')
ylabel('y')

This exemplary UUT include four (4) of lines of code. The exemplary UUT is tested across one hundred (100) different scenarios to profile what lines of code are executed, and how long each of those lines takes to perform its task.

The information on the structure of the UUT is adapted for displaying the generated test results (step 830). Adapting the information on the structure of the UUT may including transforming the information on the structure of the UUT The structure information may be transformed or adapted into other forms, and correlated with corresponding metric data collected when the UUT is tested. The structure information of the UUT may be transformed such that a test results view can provide more details and context for how the test results are to be interpreted. For example, in MATLAB, the PROFILE command returns a series of structure arrays containing a breakdown of the different functions and their statistics. The PROFILE command tracks the execution time of functions. For each function, the PROFILE command records information about execution time, number of calls, parent functions, child functions, code line hit count, and code line execution time. An exemplary command is provided as follows.

STATS=PROFILE('INFO')

This command stops the PROFILE command and displays the results.

When the UUT is textual code and the corresponding metric data is execution time, the transformed or adapted form may be a visual representation of the UUT, i.e. a report documenting the code that is tested along with the corresponding metric data associated with each line of code, a graph associating a line of code with corresponding metric data, a list of lines of code ordered in ascending order of the corresponding metric data.

The structure information of a UUT may be displayed with the metric data of the test results (step 850). The structure information of the UUT may be displayed in many different forms, depending on the unit under test. A user may define how the structure information is displayed.

Figure 9:
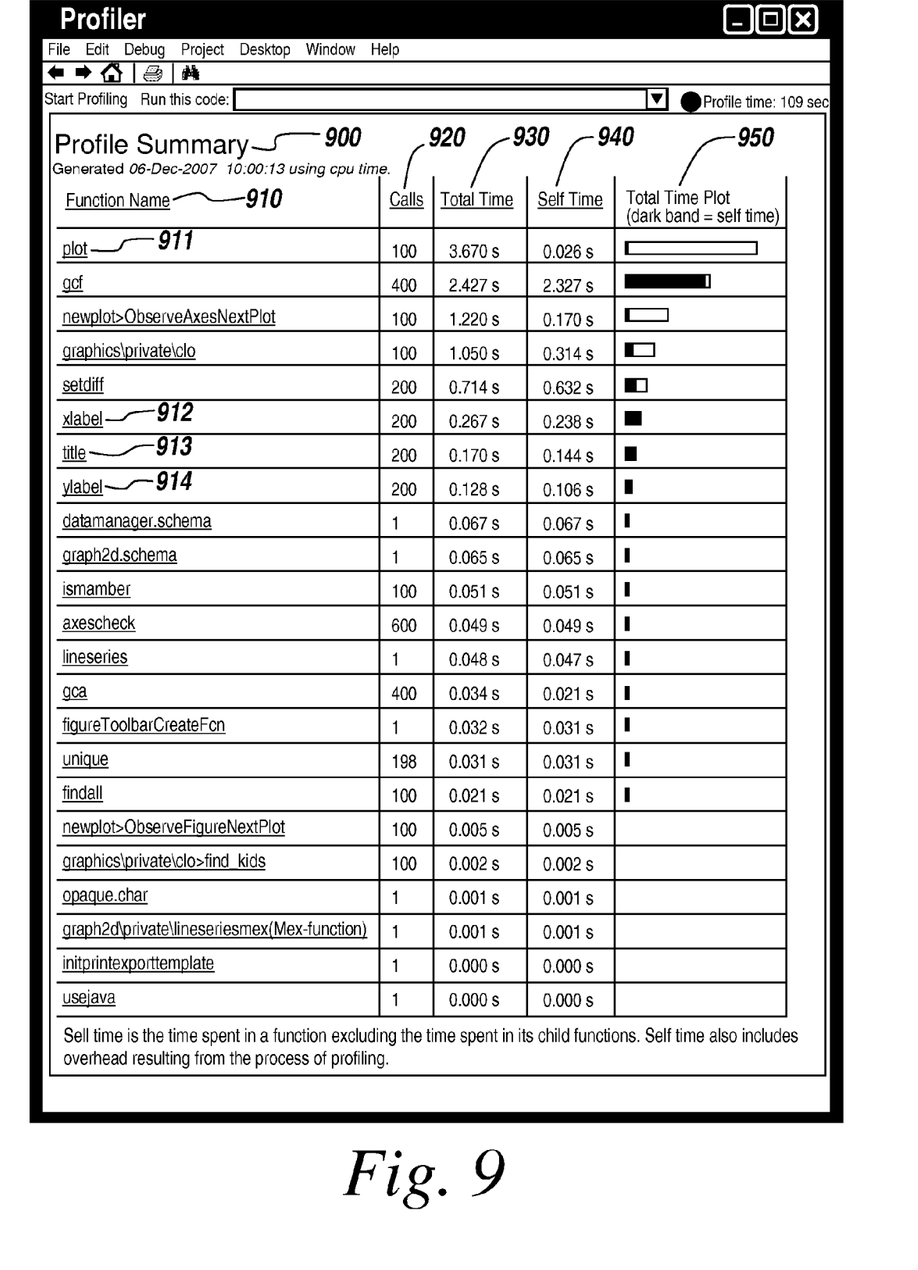
FIG. 9 is an exemplary view that displays the structure information of a UUT and the metric data of test results.

FIG. 9 is an exemplary view that displays structure information of a UUT and metric data of test results for the UUT. In this example, Profile Summary 900 has columns for Function Name 910, Calls 920, Total Time 930, Self Time 940 and Total Time Plot 950. The Function Name 910 may list the names of functions in the UUT, such as plot 911, xlabel 912, title 913 and ylabel 914, which are included in the above exemplary code. The other functions names may be the names of functions called by those functions. The number of Calls 920 may be the transformed or adapted structure of the UUT. The plot function is called 100 times, and the xlabel 912, title 913 and ylabel 914 functions are called 200 times. Total Time 930 and Self Time 940 may be the metric data of test results that involves line coverage collected across those calls. Self Time 940 is the time spent in a function excluding the time spent in its child functions. Self Time 940 may include overhead resulting from the process of profiling. Total Time Plot 950 provides the graphical representation of Total Time 930 and Self Time 940 for each function. This view structures generated test result data to accurately convey the structure of the UUT. The generated test results are displayed with the structure of the UUT to convey how the results are to be interpreted in the context of the UUT.

Exemplary embodiments may be provided as one or more computer-readable programs, instructions or code embodied on or in one or more mediums. The mediums may be, but are not limited to a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or even the genome in a cell nucleus. In general, the computer-readable programs, instructions or code may be implemented in any programming language. Some examples of languages that may be used include Python, C, C++, C#, Java, Javascript etc. Further, the computer readable programs, instructions or code may be implemented in a hardware description language or any other language that allows specifying computation such as, for example, Deoxyribonucleic acid (DNA). The software programs, instructions or code may be stored on or in one or more mediums as object code.

It will be appreciated that the software elements, such as programs, data, functions, etc., are illustrative objects tested in a test environment and the test environment may test other resources, such as resources relating to hardware. Exemplary software products can be found in the MATLAB® environment, the Simulink® environment, the MATLAB® Toolboxes application, the Simulink® Blocksets application, all from The MathWorks, Inc. of Natick, Mass. These software products are illustrative and the elements 420 may include other software products, for example, LabVIEW® or MATRIXx from National Instruments, Inc., SoftWIRE by Measurement Computing, VisSim by Visual Solutions, WiT by DALSA Coreco, VEE Pro by Agilent, Dymola from Dynasim AB, Extend from Imagine That, Inc., Scicos from The French National Institution for Research in Computer Science and Control (INRIA), MSC.Adams® from MSC-.Software Corporation, Rhapsody® from iLogix, Inc., Rational® from International Business Machines Corporation, ARTiSAN Studio from ARTiSAN Software Tools, Inc., SCADE™ from Esterel Technologies, Inc., Mathematica® from Wolfram Research, Inc., Maple™ from Maplesoft, a division of Waterloo Maple Inc., Scilab™ from The French National Institution for Research in Computer Science and Control (INRIA), Le Chesnay Cedex, France, etc.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 6-8, the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. Devices and/or components may be added and/or removed from the implementations of FIGS. 1A-B, 2, 3 and 4 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, wetware, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

We claim:

1. A method comprising:
    receiving multi-dimensional metric data from a plurality of test cases,
        the plurality of test cases testing a unit under test in a test environment, and
        receiving the multi-dimensional metric data being performed by a device;
    receiving a user input to select a first group of test cases from the plurality of test cases,
        receiving the user input being performed by the device;
    determining a structure of the unit under test,
        determining the structure being performed by the device;
    transforming the structure of the unit under test,
        the structure of the unit under test being transformed for displaying a portion of the multi-dimensional metric data associated with the first group of test cases;
    correlating the transformed structure of the unit under test with the portion of the multi-dimensional metric data,
        correlating the transformed structure being performed by the device; and
    providing the transformed structure of the unit under test correlated with the portion of the multi-dimensional metric data for display,
        providing the transformed structure of the unit under test correlated with the portion of the multi-dimensional metric data for display being performed by the device.

2. The method of claim 1, where the unit under test comprises software, the method further comprising:
    receiving a set of criteria for selecting test cases for testing the unit under test in the test environment; and
    filtering, based on the set of criteria, the test cases to identify the plurality of test cases for testing the unit under test.

3. The method of claim 2, where the software comprises a graphical software program.

4. The method of claim 1, where the plurality of test cases includes:
    a first test that tests the unit under test with a first test condition, and
    a second test that tests the unit under test with a second test condition.

5. The method of claim 1, where the multi-dimensional metric data comprises at least one of:
    cyclomatic complexity,
    model coverage data,
    code coverage data,
    memory usage data,
    profiling data,
    performance data, or
    statistics data.

6. The method of claim 1, further comprising:
    displaying a graphical object for providing information for a portion of the first group of test cases relative to the plurality of test cases.

7. The method of claim 1, further comprising:
    receiving an input to select a single test case; and
    displaying the multi-dimensional metric data for the single test case.

8. The method of claim 1, further comprising:
    displaying statistics for the multi-dimensional metric data for the plurality of test cases or for the portion of the multi-dimensional data associated with the first group of test cases.

9. The method of claim 1, further comprising:
    receiving an input to select a second group of test cases of the plurality of test cases; and
    determining a union or an intersection of the multi-dimensional metric data between the first group of test cases and the second group of test cases.

10. The method of claim 1, where the plurality of test cases are executed in parallel for testing the unit under test in the test environment.

11. The method of claim 1, where the device includes a multi-core processor; and
    where correlating the transformed structure of the unit under test with the portion of the multi-dimensional metric data includes:
        correlating, using the multi-core processor, the transformed structure of the unit under test with the portion of the multi-dimensional metric data.

12. A computer system comprising:
    a processor to:
        test a unit under test,
            the processor, when testing the unit under test being to:
                perform a plurality of test cases,
                generate multi-dimensional metric data based on performing the plurality of test cases, and
                determine a structure of the unit under test;
        transform the structure of the unit under test, the structure of the unit under test being transformed for displaying the multi-dimensional metric data;
correlate the transformed structure of the unit under test with the multi-dimensional metric data; and
display the structure of the unit under test correlated with the multi-dimensional metric data.

13. The system of claim 12, where the multi-dimensional metric data includes at least one of:
cyclomatic complexity,
model coverage data,
code coverage data,
memory usage data,
profiling data,
performance data, or
statistics data.

14. The system of claim 12, where the processor is further to:
receive an input to select a first group of test cases and a second group of test cases; and
determine a union or an intersection of the multi-dimensional metric data between the first group of test cases and the second group of test cases.

15. The system of claim 12, where, when transforming the structure of the unit under test, the processor is to:
profile an execution time of the unit under test, and
transform the structure of the unit under test based on profiling the execution time.

16. The system of claim 12, where the unit under test includes application specific types of logic.

17. The system of claim 12, where the test environment comprises a technical computing environment.

18. A non-transitory computer-readable storage medium storing instructions, the instructions comprising:
one or more instructions that, when executed by a computing device, cause the computing device to:
perform a plurality of test cases to test a unit under test in a test environment;
produce multi-dimensional metric data based on performing the plurality of test cases;
determine information relating to a structure of the unit under test;
transform the structure of the unit under test,
the structure of the unit under test being transformed for displaying the multi-dimensional metric data;
correlate the transformed structure of the unit under test with the multi-dimensional metric data; and
provide the transformed structure of the unit under test correlated with the multi-dimensional metric data for display.

19. The non-transitory computer-readable storage medium of claim 18, where the instructions further comprise:
one or more instructions that, when executed by the computing device, cause the computing device to display a graphical object for indicating a portion of the plurality of test cases included in the first group of test cases.

20. The non-transitory computer-readable storage medium of claim 18, where the instructions further comprise:
one or more instructions that, when executed by the computing device, cause the computing device to:
receive an input to select a single test case of the plurality of test cases; and
display the multi-dimensional metric data for the single test case.

* * * * *